United States Patent
Miyaishi

(10) Patent No.: US 9,568,094 B2
(45) Date of Patent: Feb. 14, 2017

(54) CONTROL DEVICE OF AUTOMATIC TRANSMISSION

(71) Applicants: JATCO Ltd, Fuji-shi, Shizuoka (JP); NISSAN MOTOR CO., LTD., Yokohama-shi, Kanagawa (JP)

(72) Inventor: Hironori Miyaishi, Kawasaki (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/914,859

(22) PCT Filed: Sep. 4, 2014

(86) PCT No.: PCT/JP2014/073277
§ 371 (c)(1),
(2) Date: Feb. 26, 2016

(87) PCT Pub. No.: WO2015/037503
PCT Pub. Date: Mar. 19, 2015

(65) Prior Publication Data
US 2016/0215876 A1    Jul. 28, 2016

(30) Foreign Application Priority Data
Sep. 13, 2013 (JP) .................................. 2013-191098

(51) Int. Cl.
*F16H 61/02* (2006.01)
*F16H 59/78* (2006.01)
*F16H 61/68* (2006.01)

(52) U.S. Cl.
CPC .......... *F16H 61/0213* (2013.01); *F16H 59/78* (2013.01); *F16H 61/68* (2013.01); *F16H 2061/0232* (2013.01)

(58) Field of Classification Search
CPC ...... F16H 61/0213; F16H 59/74; F16H 59/78; F16H 2061/0232
See application file for complete search history.

(56) References Cited

U.S. PATENT DOCUMENTS

| 5,643,135 | A  | * | 7/1997  | Tabata  | F16H 61/0213 477/154 |
| 2013/0345021 | A1 | * | 12/2013 | Koizumi | B60W 10/06 477/98 |
| 2014/0214289 | A1 | * | 7/2014  | Ott     | B60W 10/06 701/54 |

FOREIGN PATENT DOCUMENTS

JP    H08312774 A    11/1996

* cited by examiner

*Primary Examiner* — Derek D Knight
(74) *Attorney, Agent, or Firm* — Foley & Lardner LLP

(57) ABSTRACT

Provided is a control device of an automatic transmission, by which a supercharger can be prevented from becoming high in temperature and deteriorating in durability. An automatic transmission is connected to an engine (1) in which a supercharger (2) is mounted and has a manual mode to manually select a desired gear ratio from a plurality of fixed gear ratios. A control device includes a manual mode detection unit, a temperature judgment unit (31) and a gear ratio changeover unit (43) arranged such that, when the manual mode detection unit detects that the automatic transmission is in the manual mode and when the temperature judgment unit judges that the temperature of the supercharger is higher than or equal to a predetermined value, the gear ratio changeover unit changes the gear ratio of the automatic transmission to a higher gear ratio and thereby lowers the rotation speed of the engine (1).

2 Claims, 4 Drawing Sheets

CONTROL DEVICE OF AUTOMATIC TRANSMISSION

TECHNICAL FIELD

The present invention relates to a control device of an automatic transmission having a manual mode to select a fixed gear ratio in accordance with driver's intention.

BACKGROUND ART

In the case of an automatic transmission having a manual mode, it is necessary to provide a mechanism for preventing overspeed (over-revolution) of an engine because, differently from an automatic mode, the transmission does not automatically shift in the manual mode. Patent Document 1 discloses an automatic transmission control device with such an over-revolution prevention mechanism.

More specifically, the automatic transmission control device of Patent Document 1 has a shift pattern set for over-revolution prevention (as a forcible upshift speed change line). The control device determines the operation status of a vehicle based on a vehicle speed and a throttle opening, judges that there is applied a higher-than-allowable load when the vehicle operation status exceeds the forcible upshift speed change line, and then, performs a forcible upshift of the transmission. In the case where the vehicle is driven continuously for a predetermined time without the above forcible upshift judgment being made under the application of a load slightly lower than the allowable level, the drive system of the vehicle is overloaded so that the durability of the engine and automatic transmission deteriorates due to frictional heat of sliding parts such as bearings. In order to avoid this problem, the control device further detects a high-load operation state of the engine, measures the time of continuation of the high-load operation state and performs a forcible upshift of the transmission when the time of continuation of the high-load operation state becomes longer than or equal to a given value.

PRIOR ART DOCUMENTS

Patent Documents

Patent Document 1: Japanese Laid-Open Patent Publication No. H08-312774

SUMMARY OF THE INVENTION

Problems to be Solved by the Invention

The above-conventional automatic transmission control device faces the following problem.

In the over-revolution prevention control, the conventional automatic transmission control device detects the high-load operation state of the engine on the basis of the throttle opening and engine rotation speed. In the case where the engine is equipped with a supercharger, however, there is a possibility that the supercharger may reach a high temperature even though the engine is not in the high-load operation state. In this case, the conventional automatic transmission control device does not identify the high-load operation state and thus does not execute the over-revolution prevention control. As a result, the supercharger deteriorates in durability due to high temperature.

The present invention has been made in view of the above problems. It is an object of the present invention to provide a control device of an automatic transmission, by which a supercharger can be prevented from becoming high in temperature and deteriorating in durability.

Means for Solving the Problems

As a solution to this object, the present invention provides a control device of an automatic transmission, the automatic transmission being connected to an engine and having a manual mode to manually select a desired gear ratio from a plurality of fixed gear ratios, the engine comprising a supercharger, the control device comprising: a manual mode detection unit that detects whether the automatic transmission is set in the manual mode; a temperature detection unit that detects a temperature of the supercharger; a temperature judgment unit that judges whether the temperature of the supercharger detected by the temperature detection unit is higher than or equal to a predetermined value; and a gear ratio changeover unit that changes the gear ratio of the automatic transmission to a higher one of the fixed gear ratios and lowers a rotation speed of the engine when the manual mode detection unit detects that the automatic transmission is set in the manual mode and when the temperature judgment unit judges that the temperature of the supercharger is higher than or equal to the predetermined value.

It is a preferred aspect of the present invention to determine target input rotation speed limits of the automatic transmission according to the temperature of the supercharger, oil temperature of the engine and oil temperature of the automatic transmission, respectively, and set the predetermined value based on the lowest one of these target input rotation speed limits.

It is also a preferred aspect of the present invention that the temperature detection unit detects the temperature of an intake air at an outlet of the supercharger as the temperature of the supercharger.

Effects of the Invention

The control device of the automatic transmission according to the present invention is configured to, even though the engine is not in a high-load operation state, change the currently selected gear ratio to a higher gear ratio and thereby lower the rotation speed of the engine upon detecting that the supercharger reaches a high temperature during manual-mode operation of the automatic transmission. It is therefore possible to decrease the temperature of the supercharger and prevent deterioration in the durability of the supercharger.

By detecting the temperature of the intake air at the outlet of the supercharger as the temperature of the supercharger, it is possible to utilize the intake air temperature sensor as the temperature detection unit and decrease the cost of the control device.

DETAILED DESCRIPTION OF THE EMBODIMENTS

Hereinafter, an exemplary embodiment of the present invention will be described in detail below with reference to the drawings.

Embodiment 1

A control device according to Embodiment 1 is designed for use in a hybrid vehicle (HEV) driven by an engine and an electric motor.

In the present embodiment, the engine is a gasoline engine and equipped with a supercharger for engine boosting. There is provided a continuously variable transmission (CVT) as an automatic transmission such that output power of the engine is transmitted through the continuously variable transmission to rotate driving wheels of the vehicle.

The continuously variable transmission is of known type, having an input-side primary pulley, an output-side secondary pulley and a metal belt wound around the primary and secondary pulleys so as to continuously vary a gear ratio according to groove widths of the primary and secondary pulleys. In the present embodiment, the continuously variable transmission is operable in an automatic mode where a gear ratio is automatically varied in a non-stepwise manner or in a manual mode where a desired gear ratio is manually selected from a plurality of fixed gear ratios in accordance with driver's intention.

The motor is provided with an inverter and adapted to not only rotate the vehicle driving wheels by the supply of power from the inverter, but also function as a generator during braking of the vehicle and thereby perform a regenerative function so as to recover a part of braking energy as an alternating current, convert the alternating current to a direct current and store the direct current in a battery.

Figure 1:
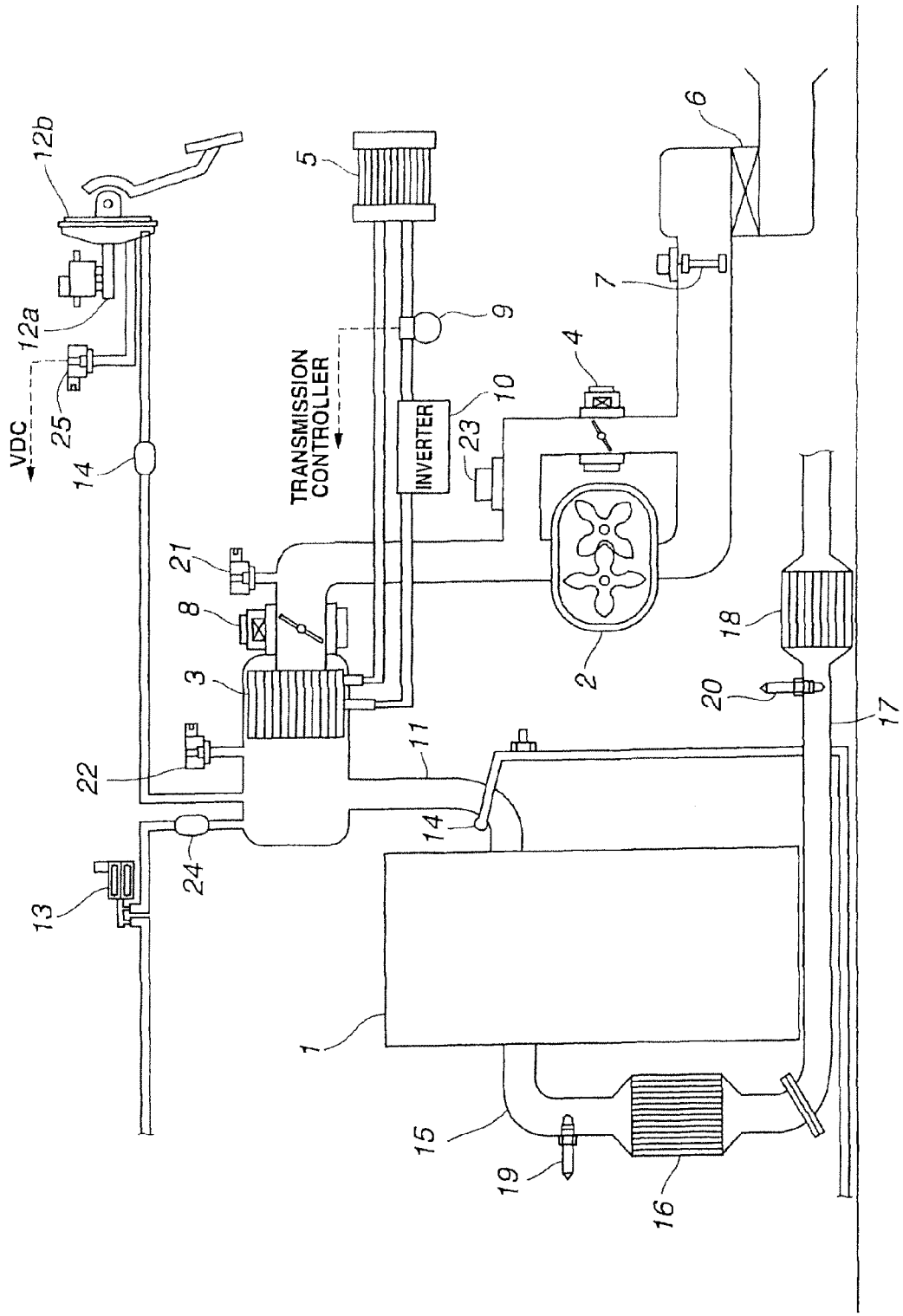
FIG. 1 is a system diagram of an engine equipped with a supercharger and to which an automatic transmission with a control device according to Embodiment 1 of the present invention is connected.

The configurations of the engine to which the continuously variable transmission is connected, the supercharger and their peripheral parts are shown in FIG. 1.

As shown in the drawing, an intake air is compressed by the supercharger 2, cooled in an intercooler 3 and supplied to the engine 1 though an intake manifold 11. In the present embodiment, the supercharger 2 has a Roots compressor in which two four-blade rotors rotate in mesh with each other.

A bypass passage is provided to bypass the supercharger 2 and establish communication between intake passages on the upstream and downstream sides of the supercharger 2. A bypass valve 4 is arranged in the bypass passage to control a boost pressure of the supercharger 2. A relief valve 23 is arranged in the bypass passage at a position downstream of the bypass valve 4 to prevent the boost pressure from becoming excessively high.

The intake passage on the upstream side of the supercharger 2 is open to the air through an air filter 6 for air intake. An airflow meter 7 (with an air temperature sensor) is arranged between the supercharger 2 and the air filter 6 to detect the amount and temperature of the intake air taken in from the intake opening. The detection result of the airflow meter is sent as a detection signal to an engine controller 30 (ECM; see FIG. 2).

The intake passage on the downstream side of the supercharger 2 is connected to the intercooler 3 through an electronically controlled throttle valve 8. The throttle valve 8 is operated under the control of the engine controller 30 to control the amount of the intake air supplied to the engine 1.

The intercooler 3 is connected to a sub-radiator 5. A coolant is cooled in the sub-radiator 5 and fed by a coolant pump 9 to the intercooler 3 such that the intake air compressed to a high temperature by the supercharger 2 is cooled with the coolant in the intercooler. In the present embodiment, the coolant is also fed to cool the inverter 10.

The downstream side of the intercooler 3 is connected to the intake manifold 11 of the engine 1. Further, the downstream side of the intercooler 3 is connected through a check valve 14 to a brake booster 12b, which is coupled to a master cylinder 12a of a brake device, and connected through a check valve 24 and a purge control valve 13 to a canister. A pressure sensor 25 is provided on the brake booster for control of a VDC (vehicle dynamic control) device.

A fuel injector 14 is arranged in the intake manifold 11 at a position near an intake port of the engine 1 to inject a controlled amount of fuel into the intake air according to an accelerator opening etc.

An exhaust manifold 15 is connected to an exhaust port of the engine 1. A three-way catalyst 16 is disposed on the downstream side of a collection part of the exhaust manifold 15. An exhaust pipe 17 is proved on the downstream side of the three-way catalyst 16. A main catalyst 18 is disposed at a midpoint in the exhaust pipe 17 and below the vehicle body floor. An exhaust gas is purified by the catalyst 18, fed through the exhaust pipe 17, and then, discharged to the air from a tailpipe through a muffler although the tailpipe and the muffler are not specifically shown in the drawing.

An upstream-side oxygen sensor 19 is provided in the collection part of the exhaust manifold 15, whereas a downstream-side oxygen sensor 20 is provided at a position immediately upstream of the main catalyst 18. These oxygen sensors are arranged to detect the concentration of oxygen in the exhaust gas. The detection results of the oxygen sensors are sent as respective detection signals to the engine controller 30.

Further, a first pressure/temperature sensor 21 (corresponding to the claimed temperature detection unit) is provided at an outlet position of the supercharger 2, i.e., at a position downstream of the supercharger 2 and upstream of the electronically controlled throttle valve 8 to detect and measure the pressure and temperature of the boosted intake air at this supercharger outlet position. A second pressure/temperature sensor 22 is provided at an outlet position of the intercooler 3 to detect and measure the pressure and temperature of the intake air cooled in the intercooler 3. The pressure and temperature detection results of these pressure/temperature sensors are sent as respective signals to the engine controller 3.

The continuously variable transmission is of known configuration (as disclosed in e.g. Japanese Laid-Open Patent Publication No. 2002-243031, which was filed by the present applicant). Thus, a detailed illustration and explanation of the continuously variable transmission will be omitted herefrom; and only parts and portions of the continuously variable transmission relevant to the present invention will be explained below.

Figure 2:
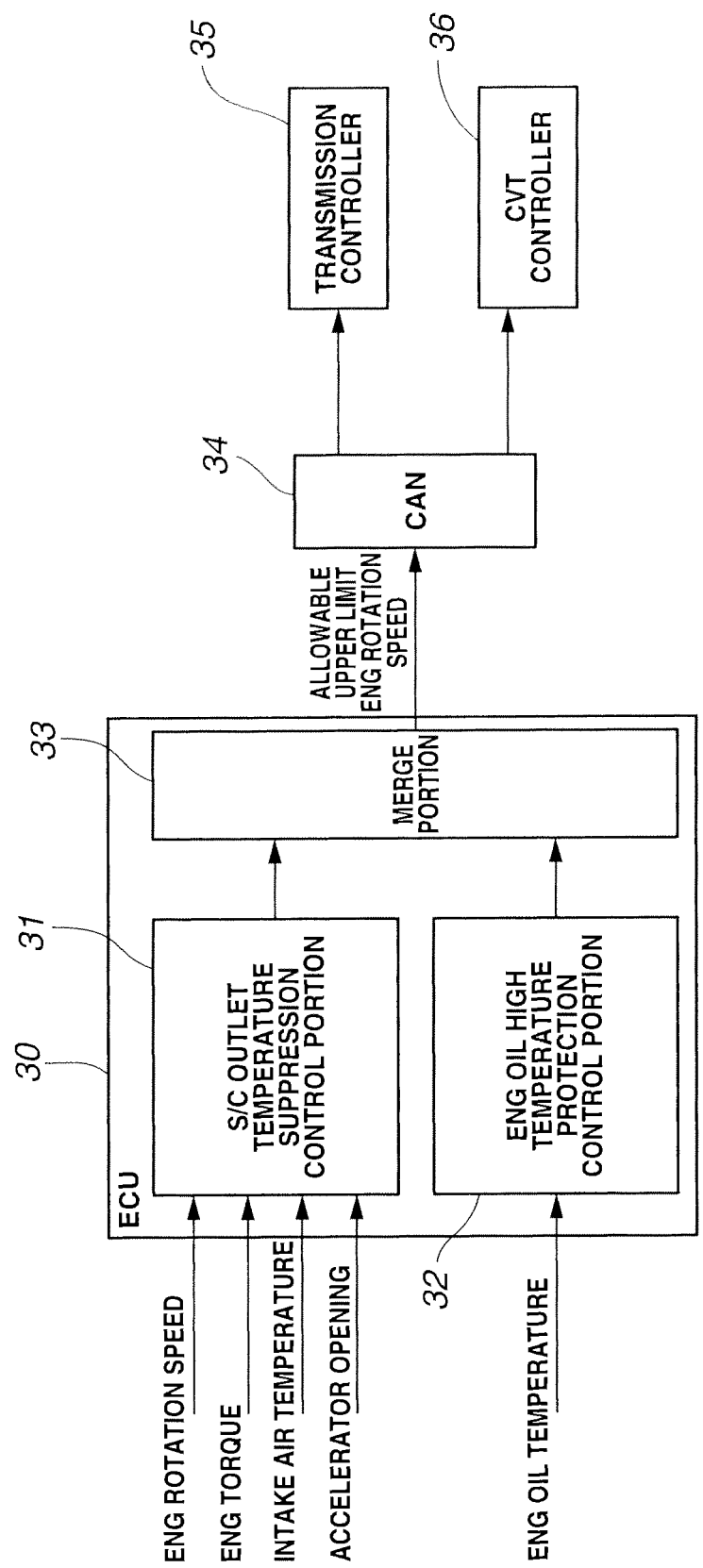
FIG. 2 is a system diagram of the control device according to Embodiment 1 of the present invention.

As mentioned above, the continuously variable transmission is operable in either the automatic mode or the manual mode. In the present embodiment, a transmission controller 35 is adapted to execute shift control of the transmission in the automatic mode; and a CVT controller 36 is adapted to execute shift control of the transmission in the manual mode as shown in FIG. 2. It is alternatively feasible to execute both of these shift controls by a single controller module in which the transmission controller 35 and the CVT controller 36 are integrated.

The correlation of the engine controller 30, the transmission controller 35 and the CVT controller 36 is shown in FIG. 2.

The engine controller 30 is adapted to receive signals from various sensors such as those shown in FIG. 1, accelerator opening sensor etc. and execute start control, optimal operation control and stop control of the engine by operations of the fuel injector 14, the electronically controlled throttle valve 8 and the like according to the sensor signals. A detailed explanation of the engine start control, operation control and stop control will be omitted herefrom as these controls are well-known.

Further, the engine controller 30 is provided with a supercharger outlet temperature suppression control portion 31 (corresponding to the claimed temperature judgment unit), an engine oil high temperature protection control portion 32 and a merge portion 33 and adapted to perform a supercharger protection function according to the present invention.

Into the supercharger outlet temperature suppression control portion 31, there are inputted the engine rotation speed signal, the engine torque signal, the intake air temperature signal of the first pressure/temperature sensor 21 and the accelerator opening signal. As mentioned above, the intake air temperature signal of the first pressure/temperature sensor 21 indicates the temperature of the intake air at the outlet of the supercharger. Based on the inputted signals, the supercharger outlet temperature suppression control portion 31 sets a first upper limit engine rotation speed at which the temperature of the intake air at the outlet of the supercharger does not become higher than or equal to a predetermined intake air temperature value. This engine rotation speed is inputted into the merge portion 33. The predetermined intake air temperature value is herein set to be equal to, or close to and lower than, a temperature value at which the durability of the supercharger 2 starts deteriorating.

On the other hand, the engine oil temperature signal is inputted into the engine oil high temperature protection control portion 32. The engine oil high temperature protection control portion 32 sets, based on the inputted signal, a second upper limit engine rotation speed at which the engine oil temperature does not become higher than or equal to a predetermined oil temperature value. This engine rotation speed is inputted into the merge portion 33. The predetermined oil temperature value is herein set to be equal to, or close to and lower than, a temperature value at which the engine oil starts deteriorating.

The merge portion 33 merges the above limit speed values respectively set corresponding to the increase in supercharger outlet temperature and to the increase in engine oil temperature, and then, outputs the merged limit speed value as an allowable upper limit engine rotation speed. More specifically, the merge is performed by comparing the first upper limit engine rotation speed inputted from the supercharger outlet temperature suppression control portion 31 with the second upper limit engine rotation speed inputted from the engine oil high temperature protection control portion 32, selecting the lower one of the first and second upper limit engine rotation speeds and outputting a signal indicative of the selected upper limit engine rotation speed as the allowable upper limit engine rotation speed in the present embodiment.

The allowable upper limit engine rotation speed signal is sent and inputted into the transmission controller 35 and the CVT controller 36 through a CAN 34.

When it is judged by a select switch (corresponding to the claimed manual mode detection unit) that the automatic transmission is set in the automatic mode (such as D position or L position), the transmission controller 35 executes shift control to change the gear ratio of the transmission to a higher side such that the target rotation speed of the primary pulley becomes lower than or equal to the allowable upper limit engine speed.

When it is judged by the select switch that the automatic transmission is set in the manual mode, by contrast, the CVT controller 36 performs upshift of the transmission such that the target rotation speed of the primary pulley becomes lower than or equal to the allowable upper limit engine rotation speed for upper limit speed restriction control.

The supercharger high temperature protection control process executed by the CVT controller 36 during selection of the manual mode varies depending on whether the accelerator opening is in a partial opening region or a kickdown region. The respective cases will be explained in detail below.

Figure 3:
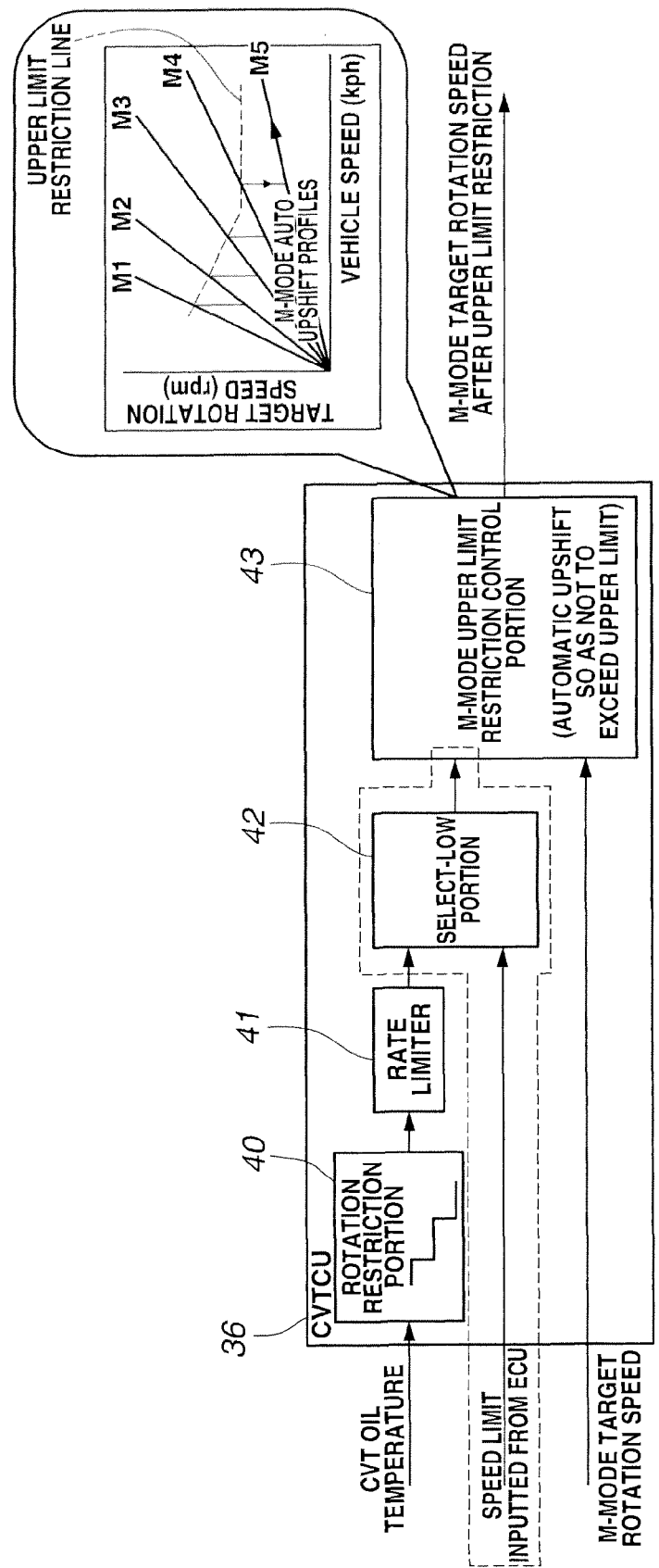
FIG. 3 is a block diagram of components of a CVT controller, provided for manual-mode upper limit speed restriction control, in the control device according to Embodiment 1 of the present invention.

In the case where the accelerator opening is in the partial opening region, the CVT controller 36 operates as follows and as shown in FIG. 3.

When a CVT oil temperature signal is inputted from an oil temperature sensor into a rotation restriction portion 40, the rotation restriction portion 40 sets a limit rotation speed value according to the CVT oil temperature with reference to a table showing the relationship of the CVT oil temperature (on the vertical axis) and the limit rotation speed value (on the horizontal axis) and outputs a signal indicative of the limit rotation speed value to a rate limiter 41. Then, the rate limiter 41 limits this signal to within a predetermined range (upper and lower limits) and sends the limited signal to a select-low portion 42.

The select-low portion 42 receives the above CVT oil temperature-dependent limit rotation speed signal and the allowable upper limit engine rotation speed signal from the engine controller 30, selects the lower one of these limit rotation speeds as an upper limit restriction speed value and sends a signal indicative of the upper limit restriction speed to an manual-mode upper limit restriction control portion 43 (corresponding to the claimed gear ratio changeover unit).

The manual-mode upper limit restriction control portion 43 receives a manual-mode target rotation speed signal and the upper limit restriction speed signal from the select-low portion 42 and, when the target rotation speed exceeds the upper limit restriction speed, performs automatic upshift of the transmission. For example, it is assumed that the manual mode has five gear stages (with linear speed change lines M1 to M5) to define the relationship of the target rotation speed (on the vertical axis) and the vehicle speed (on the horizontal axis) as shown in a balloon of FIG. 3. When the target rotation speed on the selected one of the manual-mode speed change lines is higher than an upper limit restriction line (connecting the upper limit restriction speed values of the respective gears as indicated by a broken line in the drawing), the manual-mode upper limit restriction control portion 43 performs automatic upshift from the currently selected speed change line to the other speed change line illustrated immediately below the point of intersection of the currently selected speed change line and the upper limit restriction line (e.g. from M1 to M2, from M2 to M3, from M3 to M4 or from M4 to M5) and thereby lower the target rotation speed so that the shift control of the transmission can be performed according to the newly selected speed change line. It is possible by this control to prevent not only excessive increase of the engine oil temperature but also excessive increase of the CVT oil temperature and durability deterioration of the supercharger 2 due to high temperature.

Figure 4:
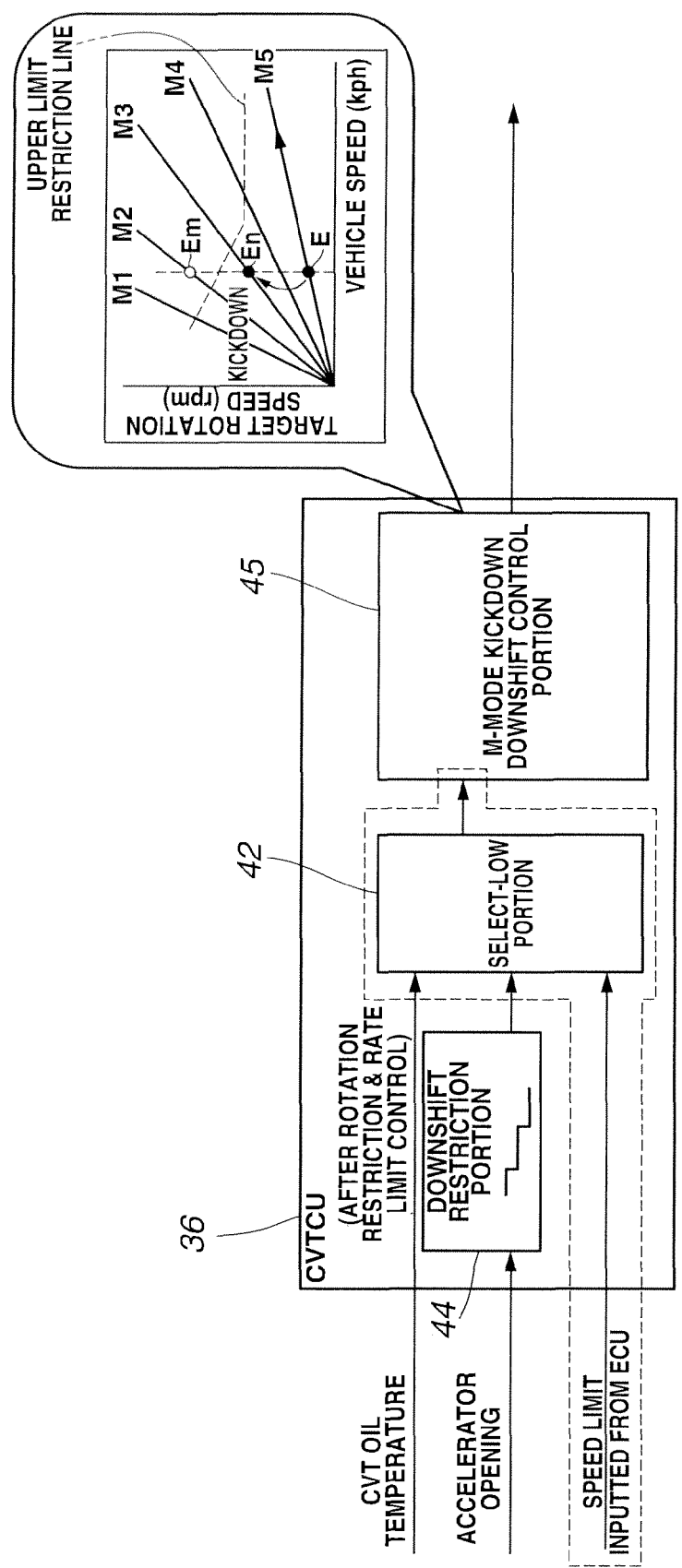
FIG. 4 is a block diagram of components of the CVT controller, provided for kickdown downshift control, in the control device according to Embodiment 1 of the present invention.

The CVT controller 36 operates as follows and as shown in FIG. 4 in the case where the accelerator pedal is depressed to the kickdown region during selection of the manual mode.

As in the case of FIG. 3, the select-low portion 42 receives the above CVT oil temperature-dependent limit rotation speed signal and the allowable upper limit engine rotation speed signal from the engine controller 30. The select-low portion 42 additionally receives a downshift-restriction rotation speed signal from a downshift restriction portion 44.

Herein, the downshift restriction portion 44 sets a current downshift-restriction rotation speed with reference to a table showing the relationship of the downshift-restriction rotation speed (on the vertical axis) and the vehicle speed (on the horizontal axis) upon judging that the accelerator opening signal from the accelerator opening sensor is in the kickdown region.

The select-low portion 42 then selects the lowest one of the CVT oil temperature-dependent limit rotation speed, the allowable upper limit engine rotation speed inputted from the engine controller 30 and the downshift-restriction rotation speed as a kickdown limit rotation speed and sends a signal indicative of the kickdown limit rotation speed limit to a kickdown downshift control portion 45 (corresponding to the claimed gear ratio changeover unit).

It is assumed that, as shown in a balloon of FIG. 4, the manual mode has five gear stages with speed change lines M1 to M5 as in the case of FIG. 3. The kickdown downshift control portion 45 performs, upon detection of kickdown among the speed change lines M1 to M5, automatic downshift to any of the speed change lines illustrated above and lower by at least one gear than the currently selected speed change line in FIG. 4 (i.e. to the upper side of FIG. 4). When the target rotation speed on the downshift target speed change line is higher than the upper limit restriction line, however, the kickdown downshift control portion 45 changes the target speed change line to the higher-gear speed change line so as to set a higher fixed gear ratio.

At the time of automatic downshift from, for example, a position E of the current speed change line (e.g. M5) to the target speed change line (e.g. M2) lower by two gears or more than the current speed change line, the kickdown downshift control portion 45 performs, upon judging that the target rotation speed Em on the downshift target speed change line exceeds the upper limit restriction line, automatic upshift to the new target speed change line (M3) higher by one gear than the current target speed change line (M2). In this case, the kickdown downshift of the transmission is actually carried out by automatically shifting up the target speed change line from M2 to M3, switching from the current speed change line M5 to the target speed change line and setting the target rotation speed En according to the newly selected speed change line.

It is conceivable that, even though the speed change line is upshifted by one gear as explained above, the target rotation speed on the upshifted speed change line exceeds the upper limit restriction line. In such a case, the speed change line is further upshifted by one gear. When the further upshifted speed change line is the same as that before the kickdown, such upshift of the speed change line is prohibited.

Accordingly, the automatic transmission control device of Embodiment 1 can obtain the following effects.

In the vehicle in which the continuously variable transmission with the manual mode is connected to the engine 1 with the supercharger 2, the gear ratio of the automatic transmission is changed to a higher fixed gear ratio upon detecting that the temperature of the intake air at the outlet of the supercharger 2 is higher than or equal to the predetermined value, even though the engine is not detected to be in a high-load operation state, during manual-mode operation. It is therefore possible to protect the supercharger 2 from durability deterioration.

As the temperature of the intake air at the outlet of the supercharger 2 is detected and adopted as the temperature of the supercharger 2, it is possible to utilize the temperature sensor originally intended for use in the control of the engine 1 and thereby possible to decrease the cost of the control device.

It is also possible to prevent both excessive increase of the engine oil temperature and overheating of the supercharger 2 as the supercharger outlet temperature suppression control is merged with the engine oil high temperature protection control by the merge portion 33.

Even at the time of kickdown during manual-mode operation, the downshift target speed change line is automatically shifted up to the higher-gear speed change line when the target rotation speed on the downshift target speed change line exceeds the upper limit rotation speed. It is thus possible to prevent deterioration of the supercharger 2 etc.

Although the present invention has been described above with reference to a specific embodiment, the present invention is not limited to the above embodiment. Various modifications and variations of the embodiment described above will be included in the scope of the present invention without departing from the technical spirit of the present invention.

For example, it is feasible to directly detect and measure the temperature of the supercharger 2 by means of a temperature sensor although the temperature of the intake air at the outlet of the supercharger 2 is measured and adopted as the temperature of the supercharger 2 in the above embodiment.

Although the belt-type continuously variable transmission is used as the automatic transmission in the above embodiment, it is feasible to utilize any other continuously variable automatic transmission or multi-stage automatic transmission.

The invention claimed is:

1. A control device of an automatic transmission, the automatic transmission being connected to an engine and having a manual mode to manually select a desired gear ratio from a plurality of fixed gear ratios, the engine comprising a supercharger, the control device comprising:
    a manual mode detection unit that detects whether the automatic transmission is set in the manual mode;
    a temperature detection unit that detects a temperature of the supercharger;
    a temperature judgment unit that judges whether the temperature of the supercharger detected by the temperature detection unit is higher than or equal to a predetermined value; and
    a gear ratio changeover unit that changes the gear ratio of the automatic transmission to a higher one of the fixed gear ratios and lowers a rotation speed of the engine when the manual mode detection unit detects that the automatic transmission is set in the manual mode and when the temperature judgment unit judges that the temperature of the supercharger is higher than or equal to the predetermined value.

2. The control device of the automatic transmission according to claim 1, wherein the temperature detection unit detects the temperature of an intake air at an outlet of the supercharger as the temperature of the supercharger.

\* \* \* \* \*